(12) United States Patent
Forstall et al.

(10) Patent No.: US 9,049,302 B2
(45) Date of Patent: Jun. 2, 2015

(54) PORTABLE MULTIFUNCTION DEVICE, METHOD, AND GRAPHICAL USER INTERFACE FOR MANAGING COMMUNICATIONS RECEIVED WHILE IN A LOCKED STATE

(75) Inventors: Scott Forstall, Mountain View, CA (US); Scott Herz, Santa Clara, CA (US); Freddy Allen Anzures, San Francisco, CA (US); Greg Christie, San Jose, CA (US); Imran Chaudhri, San Francisco, CA (US); Marcel Van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 2048 days.

(21) Appl. No.: 11/770,718

(22) Filed: Jun. 28, 2007

(65) Prior Publication Data

US 2008/0220752 A1    Sep. 11, 2008

Related U.S. Application Data

(60) Provisional application No. 60/879,469, filed on Jan. 8, 2007, provisional application No. 60/879,253, filed on Jan. 7, 2007, provisional application No. 60/883,804, filed on Jan. 7, 2007.

(51) Int. Cl.
| | |
|---|---|
| *G06F 3/033* | (2013.01) |
| *H04M 1/67* | (2006.01) |
| *H04M 1/56* | (2006.01) |
| *G06F 3/01* | (2006.01) |
| *G06F 3/0488* | (2013.01) |
| *H04M 1/725* | (2006.01) |

(52) U.S. Cl.
CPC ............... *H04M 1/67* (2013.01); *G06F 3/017* (2013.01); *G06F 3/04883* (2013.01); *H04M 1/56* (2013.01); *H04M 1/72547* (2013.01); *H04M 2250/22* (2013.01)

(58) Field of Classification Search
CPC .......................... G06F 3/04883; G06F 3/017
USPC .................................. 715/863, 864; 455/566
See application file for complete search history.

(56) References Cited

U.S. PATENT DOCUMENTS

| | | | | |
|---|---|---|---|---|
| 6,145,083 | A * | 11/2000 | Shaffer et al. ..................... 726/7 |
| 6,288,715 | B1 * | 9/2001 | Bain et al. ...................... 345/211 |
| 6,633,318 | B1 * | 10/2003 | Kim et al. ....................... 715/867 |

(Continued)

OTHER PUBLICATIONS

JGUI Professional, "Touch Password Protection," http://www.jgui.net/touch/index.html printed Dec. 30, 2005, 4 pages.

(Continued)

*Primary Examiner* — Tuyetlien Tran
(74) *Attorney, Agent, or Firm* — Morrison & Foerster LLP

(57) ABSTRACT

A computer-implemented method, performed at a portable multifunction device with a display, includes: receiving a plurality of communications via a plurality of communication modalities while the device is in a locked state; and detecting an unlock interaction by the user with the device. In response to detecting the unlock interaction, the method further includes unlocking the device and presenting a communication, or information about the communication, in the plurality of communications that was received while the device was in the locked state. The presented communication or information is presented in accordance with the corresponding communication modality.

23 Claims, 18 Drawing Sheets

(56) References Cited

U.S. PATENT DOCUMENTS

| | | | |
|---|---|---|---|
| 7,689,939 B1* | 3/2010 | Becker | 715/867 |
| 2003/0100295 A1* | 5/2003 | Sakai et al. | 455/415 |
| 2004/0041849 A1* | 3/2004 | Mock et al. | 345/867 |
| 2004/0051700 A1* | 3/2004 | Pensjo | 345/173 |
| 2004/0075701 A1* | 4/2004 | Ng | 345/867 |
| 2004/0085351 A1* | 5/2004 | Tokkonen | 345/741 |
| 2004/0225892 A1* | 11/2004 | Bear et al. | 713/200 |
| 2004/0225901 A1* | 11/2004 | Bear et al. | 713/300 |
| 2005/0070276 A1* | 3/2005 | McGarry | 455/432.2 |
| 2005/0079896 A1* | 4/2005 | Kokko et al. | 455/566 |
| 2005/0085215 A1* | 4/2005 | Kokko et al. | 455/404.1 |
| 2005/0136949 A1* | 6/2005 | Barnes, Jr. | 455/461 |
| 2005/0193144 A1* | 9/2005 | Hassan et al. | 709/238 |
| 2005/0233733 A1* | 10/2005 | Roundtree et al. | 455/414.1 |
| 2006/0015819 A1* | 1/2006 | Hawkins et al. | 715/780 |
| 2006/0020904 A1* | 1/2006 | Aaltonen et al. | 715/850 |
| 2006/0227500 A1* | 10/2006 | Brandenberg et al. | 361/683 |
| 2007/0067738 A1* | 3/2007 | Flynt et al. | 715/810 |
| 2007/0072564 A1* | 3/2007 | Adams | 455/115.1 |
| 2007/0150826 A1* | 6/2007 | Anzures et al. | 715/772 |
| 2007/0162582 A1* | 7/2007 | Belali et al. | 709/223 |
| 2007/0234208 A1* | 10/2007 | Scott | 715/700 |
| 2007/0271527 A1* | 11/2007 | Paas et al. | 715/810 |
| 2008/0126490 A1* | 5/2008 | Ahlenius et al. | 709/206 |

OTHER PUBLICATIONS

Karlson et al., "AppLens and Lunch Tile: Two Designs for One-handed Thumb Use on Small Devices," http://hcil.cs.umd.edu/trs/2004-37/2004-37.html, printed Jun. 12, 2006, 11 pages.

* cited by examiner

US 9,049,302 B2

PORTABLE MULTIFUNCTION DEVICE, METHOD, AND GRAPHICAL USER INTERFACE FOR MANAGING COMMUNICATIONS RECEIVED WHILE IN A LOCKED STATE

RELATED APPLICATIONS

This application claims priority to: (A) U.S. Provisional Patent Application No. 60/879,469, filed Jan. 8, 2007, entitled "Portable Multifunction Device"; (B) U.S. Provisional Patent Application No. 60/879,253, filed Jan. 7, 2007, entitled "Portable Multifunction Device"; and (C) U.S. Provisional Patent Application No. 60/883,804, filed Jan. 7, 2007, entitled "System and Method for Displaying Communication Notifications." All of these applications are incorporated by referenced herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/824,769, filed Sep. 6, 2006, entitled "Portable Multifunction Device." All of these applications are incorporated by reference herein.

TECHNICAL FIELD

The disclosed embodiments relate generally to portable electronic devices, and more particularly, to portable devices that receive communications via a plurality of communication modalities (e.g., telephony, instant messaging, and/or email) while in a locked state.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

Many portable electronic devices, such as cellular phones or personal digital assistants can be locked when not in use. Locking these devices prevents their inadvertent use. Additionally, these devices may also display notifications of various communications received by the device but not yet seen by the user (e.g., communications received while the device is locked). Such notifications may include notifications of communications received from external sources, such as missed calls or email messages. However, the user is typically unable to view such notifications unless the device is in an unlocked mode. Furthermore, navigating through the user interface of the device to view a particular notification or a particular communication may be cumbersome.

Accordingly, there is a need for portable multifunction devices with more transparent and intuitive user interfaces for managing communications received while the device is in a locked state that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

In one aspect of the invention, a computer-implemented method, performed at a portable multifunction device with a display, includes: receiving a plurality of communications via a plurality of communication modalities while the device is in a locked state; and detecting an unlock interaction by the user with the device. In response to detecting the unlock interaction, the method further includes unlocking the device and presenting a communication, or information about the communication, in the plurality of communications that was received while the device was in the locked state. The presented communication or information is presented in accordance with the corresponding communication modality.

In another aspect of the invention, a graphical user interface on a portable multifunction device with a display includes a plurality of icons displaying notification information. While the device is in a locked state, a plurality of communications are received via a plurality of communication modalities. In response to detecting an interaction by a user with the device, the plurality of icons display notification information for the plurality of communication modalities. In response to detecting an unlock interaction by the user with the device, the device is unlocked, and a communication in the plurality of communications is presented that was received while the device was in the locked state, or information about the communication is presented. The presented communication or information is presented in accordance with the corresponding communication modality.

In another aspect of the invention, a portable multifunction device includes a display, one or more processors, memory, and one or more programs, wherein the one or more programs are stored in the memory and configured to be executed by the one or more processors. The programs include instructions for: receiving a plurality of communications via a plurality of communication modalities while the device is in a locked state; and detecting an unlock interaction by the user with the device. The programs also include instructions for: in response to detecting the unlock interaction, unlocking the device, and presenting a communication in the plurality of communications that was received while the device was in the locked state, or presenting information about the communication, wherein the presented communication or information is presented in accordance with the corresponding communication modality.

In another aspect of the invention, a computer-program product includes a computer readable storage medium and a computer program mechanism embedded therein. The computer program mechanism comprises instructions, which when executed by a portable multifunction device with a display, cause the device to: receive a plurality of communications via a plurality of communication modalities while the device is in a locked state; detect an unlock interaction by the user with the device; and in response to detecting the unlock interaction, unlock the device, and present a communication in the plurality of communications that was received while the device was in the locked state, or present information about the communication. The presented communication or information is presented in accordance with the corresponding communication modality.

In another aspect of the invention, a portable multifunction device with a display includes: means for receiving a plurality of communications via a plurality of communication modalities while the device is in a locked state; means for detecting an unlock interaction by the user with the device; and, in response to detecting the unlock interaction, means for unlocking the device, and means for presenting a communication in the plurality of communications that was received while the device was in the locked state, or means for presenting information about the communication. The presented communication or information is presented in accordance with the corresponding communication modality.

Thus, the invention provides a portable electronic device with an intuitive, easy-to-use interface for displaying and managing communications received via a plurality of communication modalities (e.g., telephony, instant messaging, and/or email) while the device is in a locked state.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
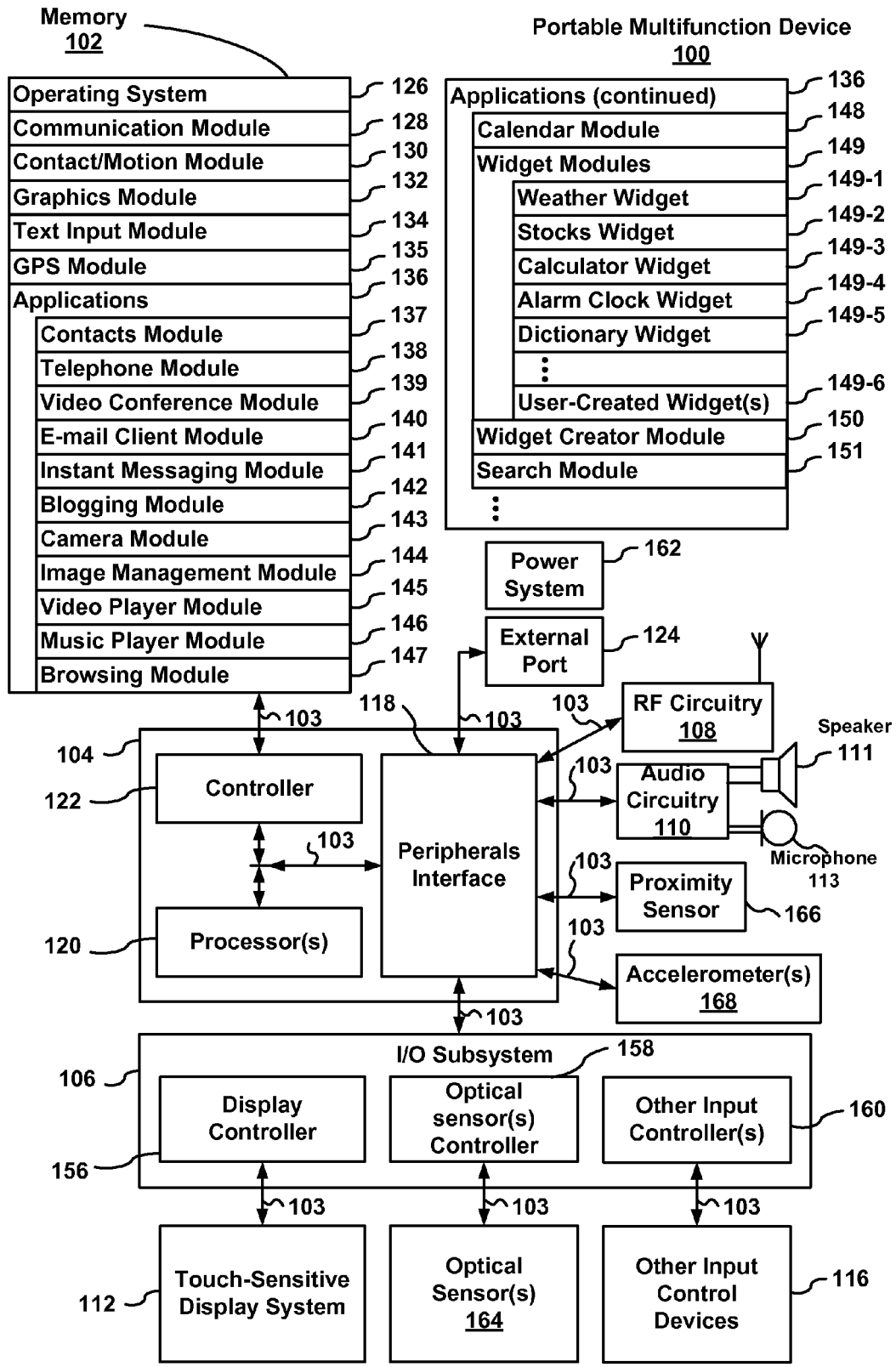
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (WiFi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable device 100, whereas touch sensitive tablets do not provide visual output. The touch screen 112 may have a resolution in excess of 100 dpi. In an exemplary embodiment, the touch screen in the display system has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005, and Ser. No. 11/240,788, "Proximity Detector In Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIG. 1 shows an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated herein by reference. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:

a contacts module 137 (sometimes called an address book or contact list);
a telephone module 138;
a video conferencing module 139;
an e-mail client module 140;
an instant messaging (IM) module 141;
a blogging module 142;
a camera module 143 for still and/or video images;
an image management module 144;
a video player module 145;
a music player module 146;
a browser module 147;
a calendar module 148;
widget modules 149, which may include weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6; and/or
search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise rearranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
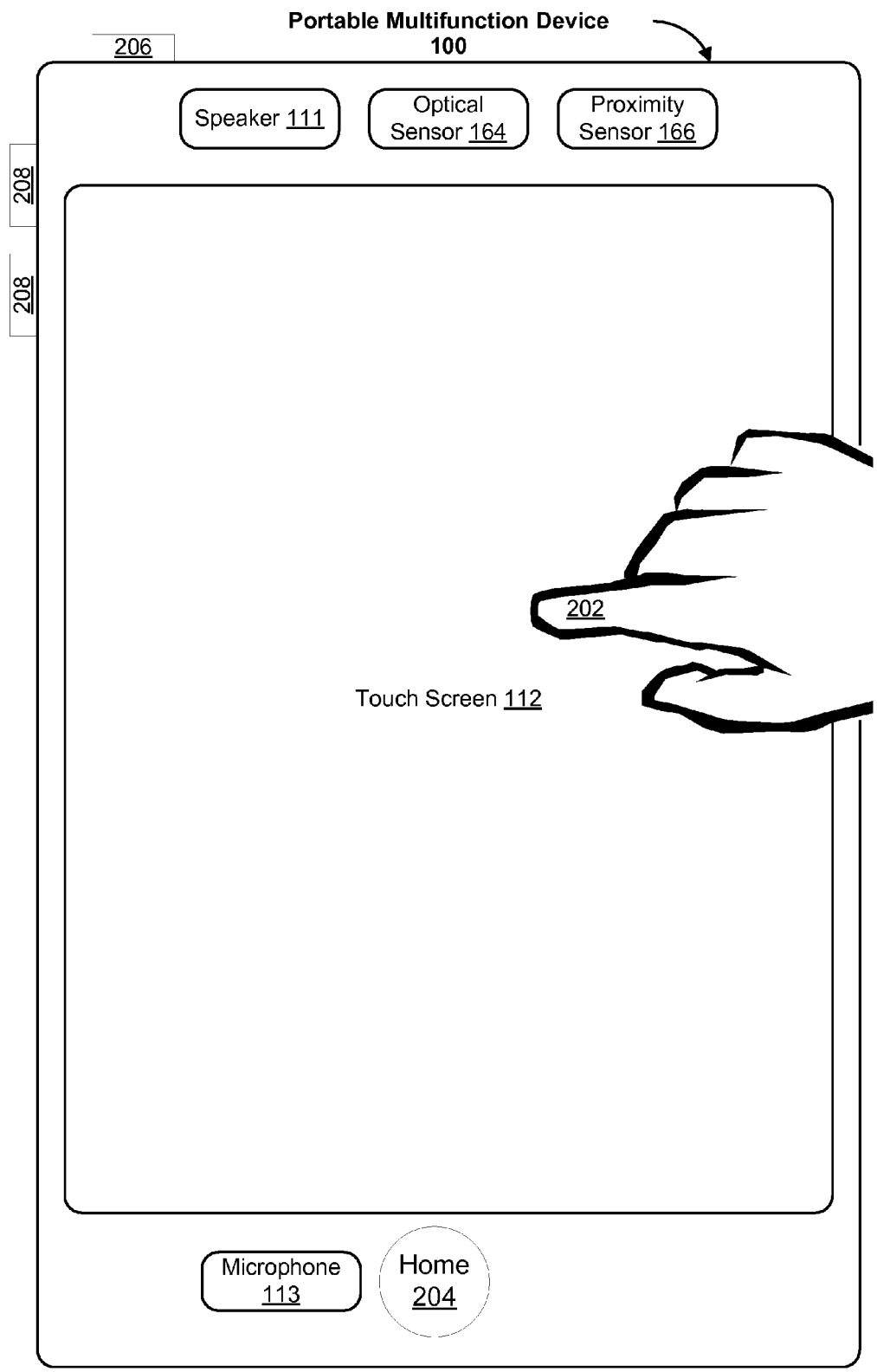
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
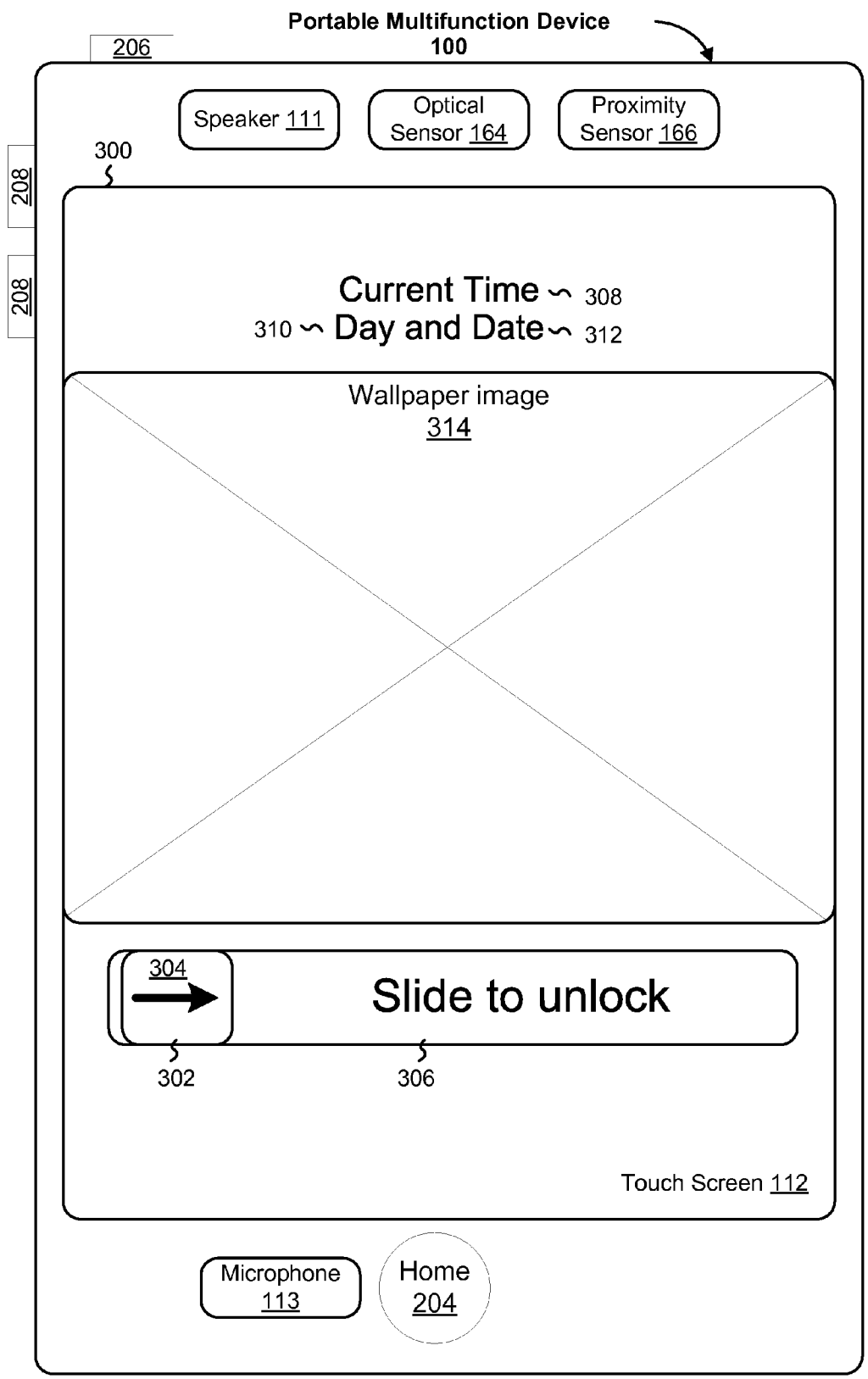
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
- Unlock image 302 that is moved with a finger gesture to unlock the device;
- Arrow 304 that provides a visual cue to the unlock gesture;
- Channel 306 that provides additional cues to the unlock gesture;
- Time 308;
- Day 310;
- Date 312; and
- Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference.

Figure 4:
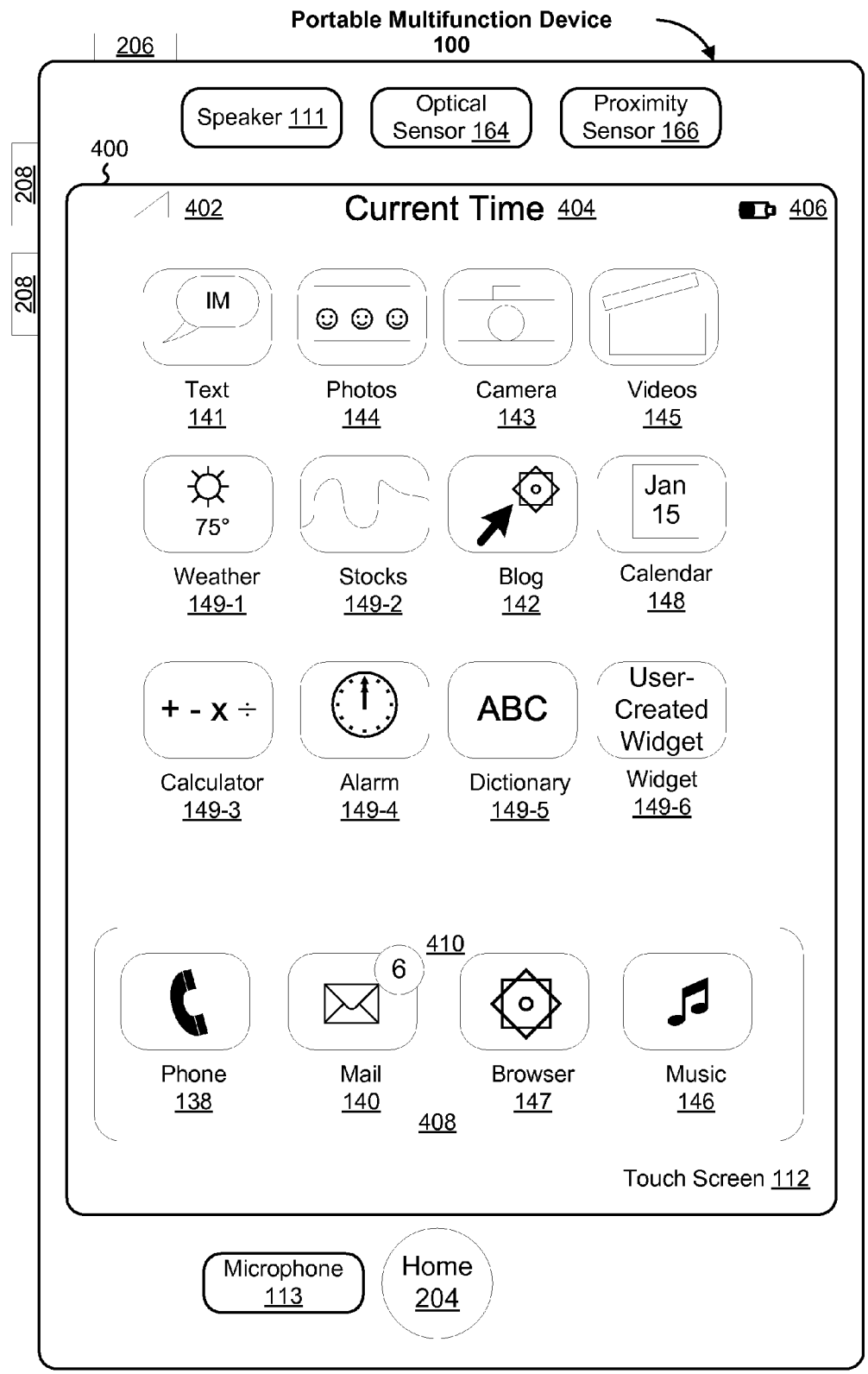
FIG. 4 illustrates an exemplary user interface for a menu of applications on a portable multifunction device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:
- Signal strength indicator 402 for wireless communication;
- Time 404;
- Battery status indicator 406;
- Tray 408 with icons for frequently used applications, such as one or more of the following:
  - Phone 138;
  - E-mail client 140, which may include an indicator 410 of the number of unread e-mails;
  - Browser 147; and
  - Music player 146; and
- Icons for other applications, such as one or more of the following:
  - IM 141;
  - Image management 144;

Camera 143;
Video player 145;
Weather 149-1;
Stocks 149-2;
Blog 142;
Calendar 148;
Calculator 149-3;
Alarm clock 149-4;
Dictionary 149-5; and
User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference.

FIGS. 5A-5F illustrate exemplary user interfaces for the display of communication notifications on a portable multifunction device in accordance with some embodiments. In some embodiments, these user interfaces include the following elements, or a subset or superset thereof: 302, 304, 306, 308, 310, 312, and 314, as described above, and communication notification icons 5302.

Figure 8A:
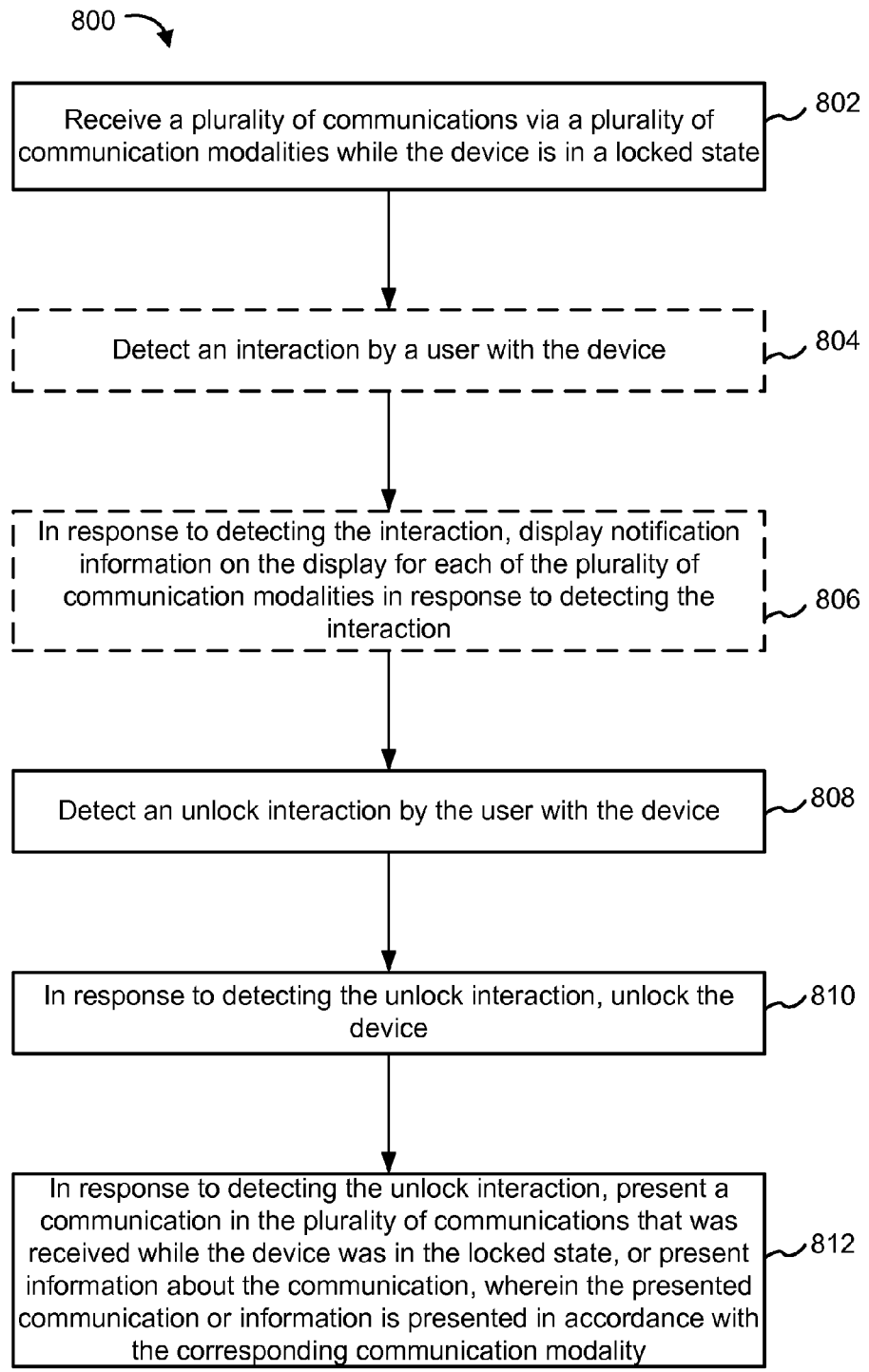
FIGS. 8A and 8B are flow diagrams illustrating processes for managing communications received by a portable multifunction device while the device is in a locked state in accordance with some embodiments.
Figure 8B:
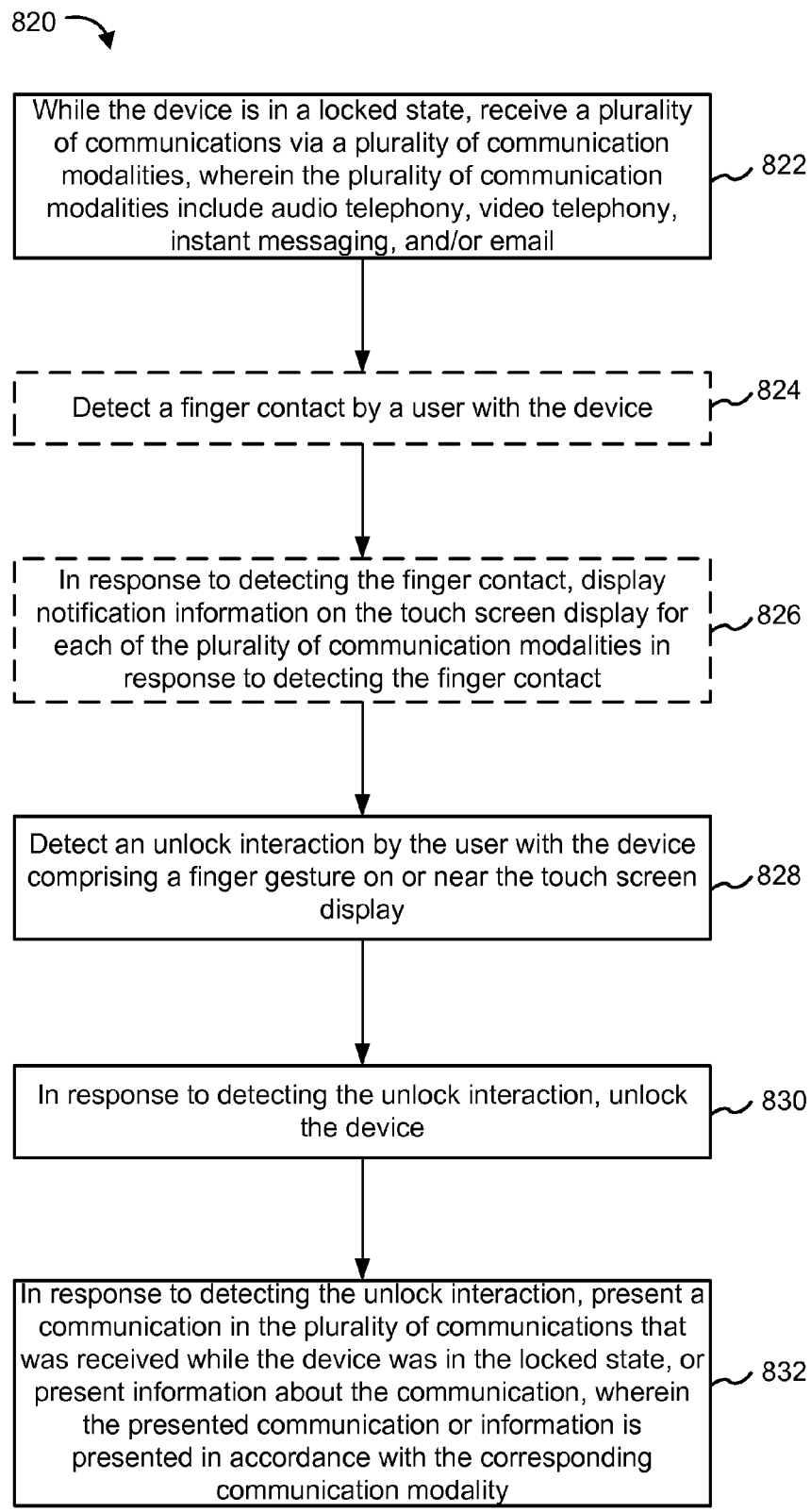

FIGS. 8A and 8B are flow diagrams illustrating processes for displaying communication notifications on a portable multifunction device in accordance with some embodiments. It will be appreciated by those of ordinary skill in the art that one or more of the acts described may be performed by hardware, software, or a combination thereof, on the portable multifunction device.

A plurality of communications are received (802, FIG. 8A; 822, FIG. 8B) via a plurality of communication modalities while the device is in a locked state. In some embodiments, the plurality of communication modalities include audio telephony, video telephony, instant messaging, and/or email (822, FIG. 8B).

In some embodiments, the plurality of communications include text communications and audio/video communications. In some embodiments, the text communications include instant messages and/or email messages. In some embodiments, the audio/video communications include phone audio messages (sometimes called voice messages or voice mail messages) and/or video messages.

In some embodiments, the plurality of communications include a phone message, an instant message, and/or an email message. In some embodiments, the plurality of communication modalities include audio telephony, video telephony, instant messaging, and/or email.

In some embodiments, interaction with the device by a user is detected (804) while the device remains in the locked state.

In some embodiments, the display is a touch screen display and detecting the interaction by the user with the device includes detecting a contact by the user with the touch screen display. In some embodiments, the contact is a finger contact (824, FIG. 8B). In some embodiments, the contact is a stylus contact. Furthermore, in some embodiments, the device is configured to ignore touch screen contacts that are typically not indicative of user interaction with the device. For example, a touch screen contact that covers more than a predefined portion (e.g., 25, 30 or 50 percent) of the touch screen may be ignored by the device, because such contact is indicative of the device being inside a carrying case, or a user's pocket, or the like.

In some embodiments, in response to detecting the interaction, notification information for each of the plurality of communication modalities is displayed (806, FIG. 8A; 826 FIG. 8B) on the display. Exemplary user interfaces with notification information are shown in FIGS. 5A-5F.

In some embodiments, displaying notification information comprises, in response to detecting the interaction, displaying notification information on the display identifying communications from a plurality of communication sources received via the plurality of communication modalities (e.g., FIGS. 5A-5F).

Figure 5A:
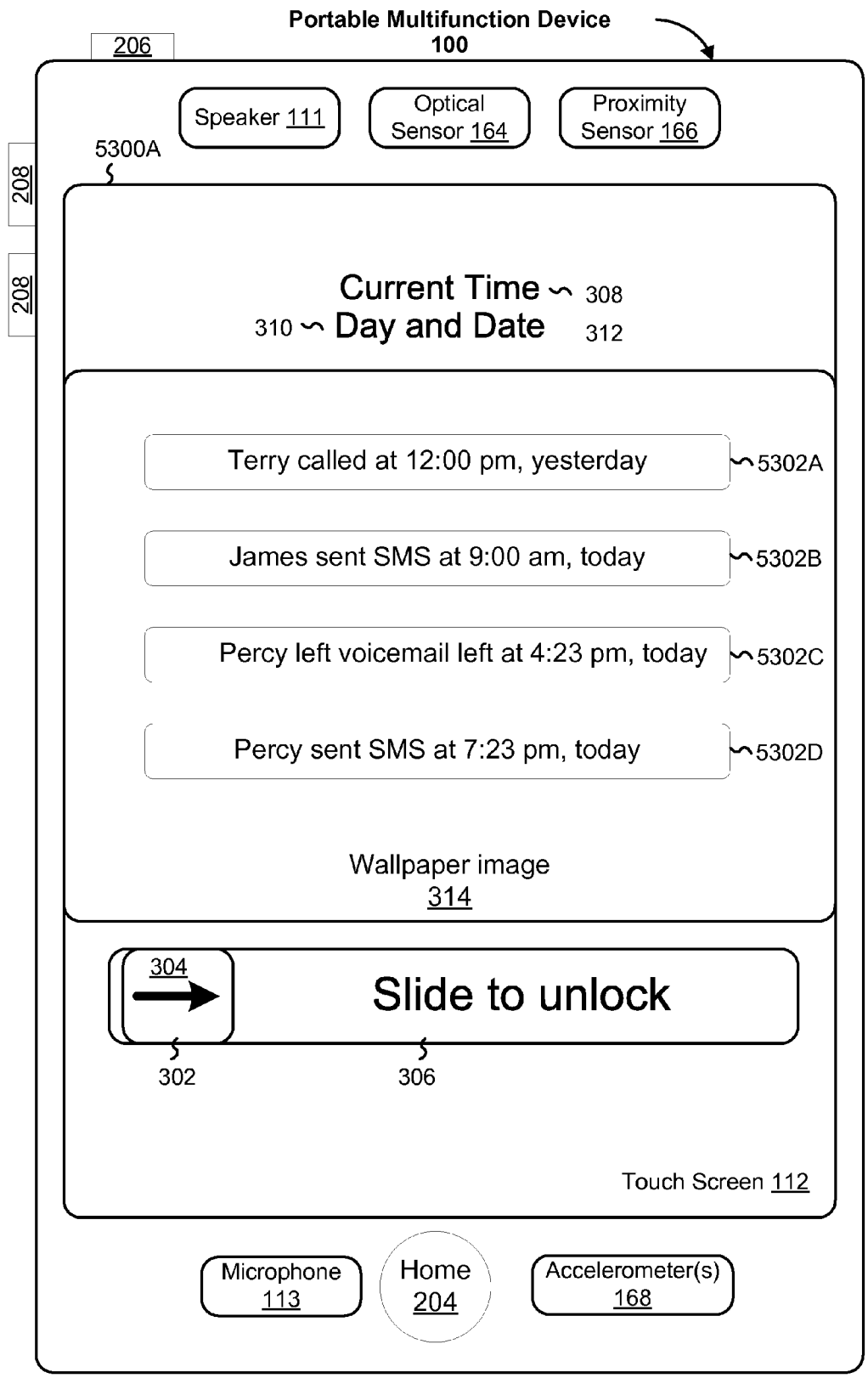
FIGS. 5A-5F illustrate exemplary user interfaces for the display of communication notifications on a portable multifunction device in accordance with some embodiments.
Figure 5B:
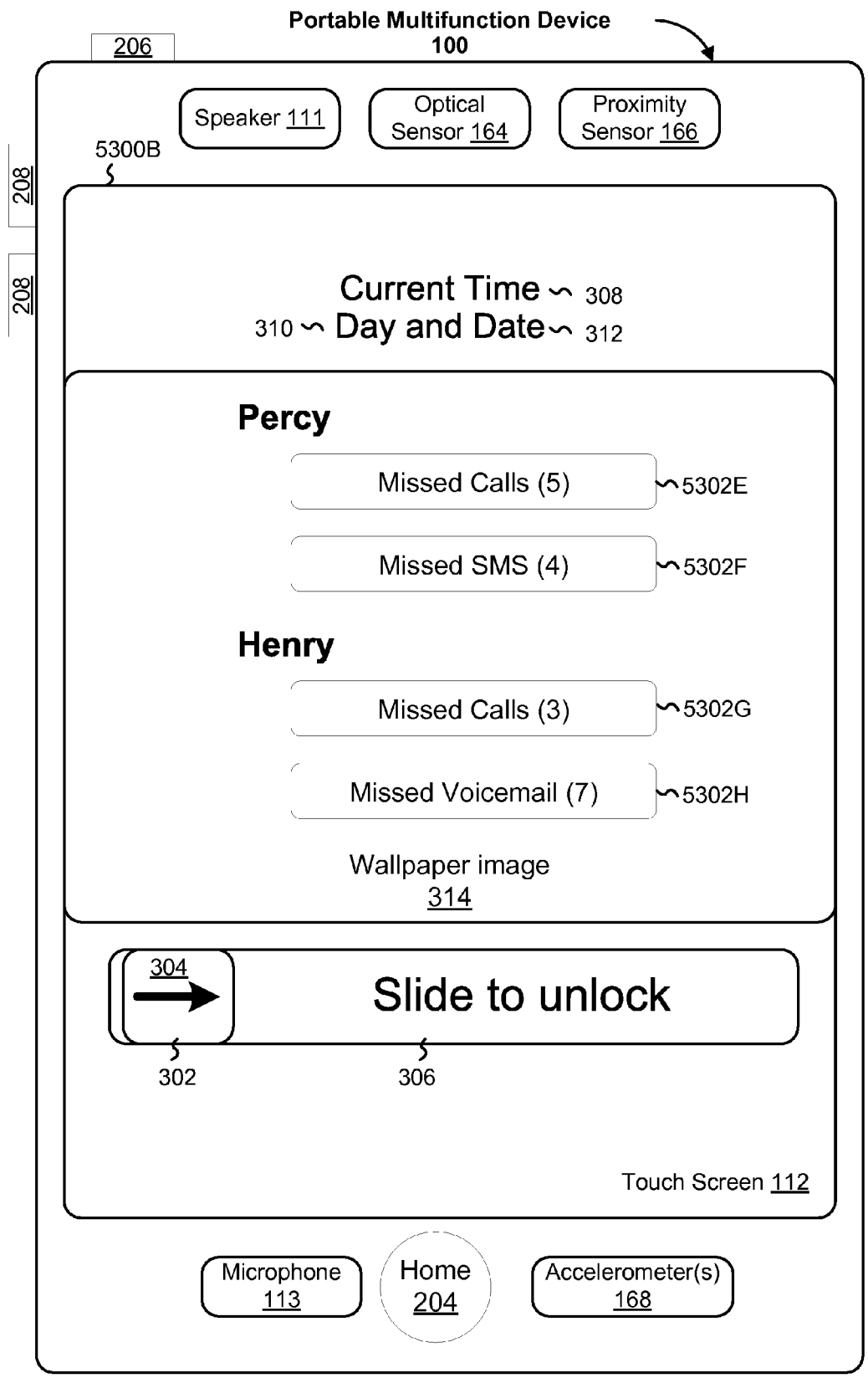
Figure 5C:
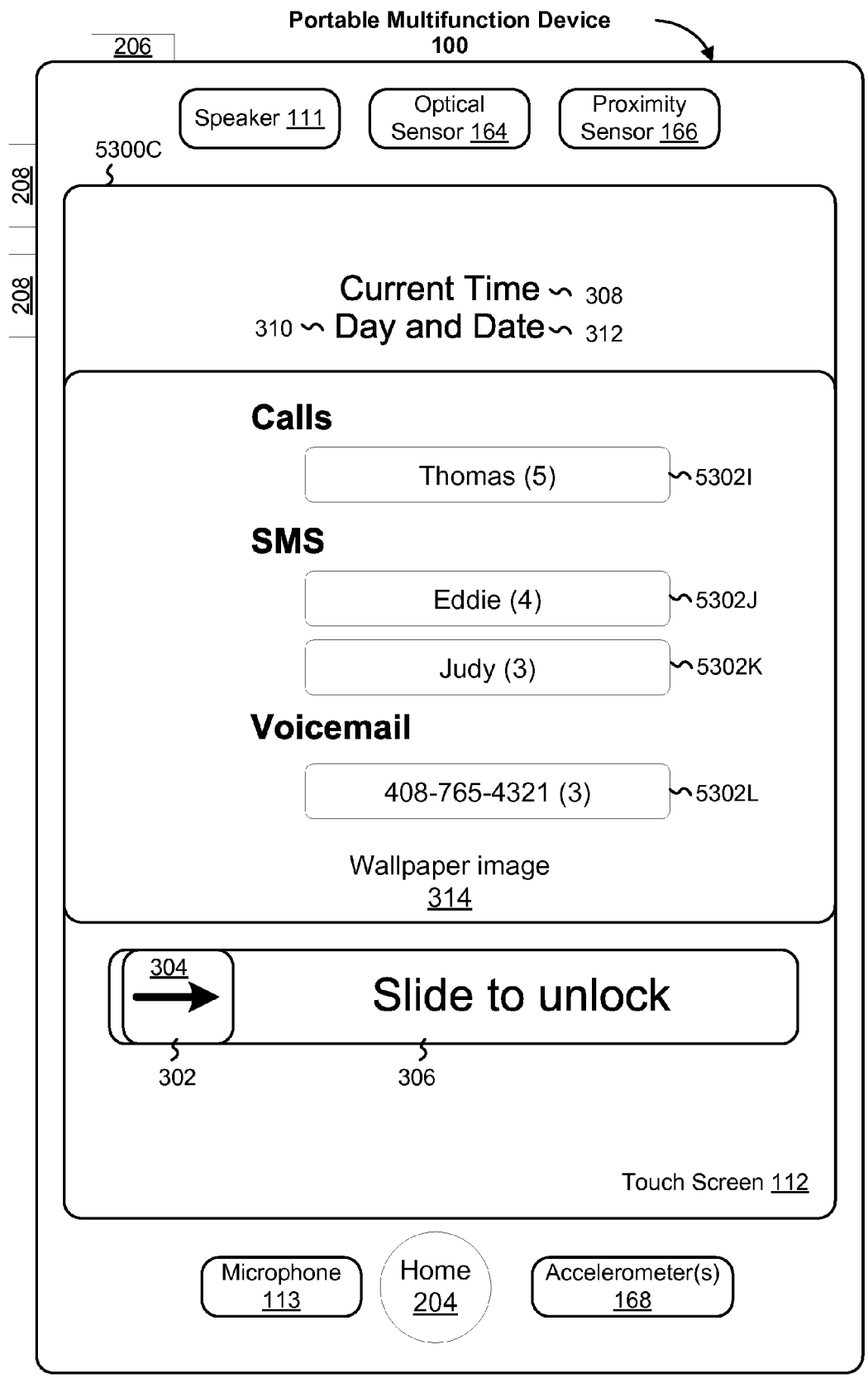
Figure 5D:
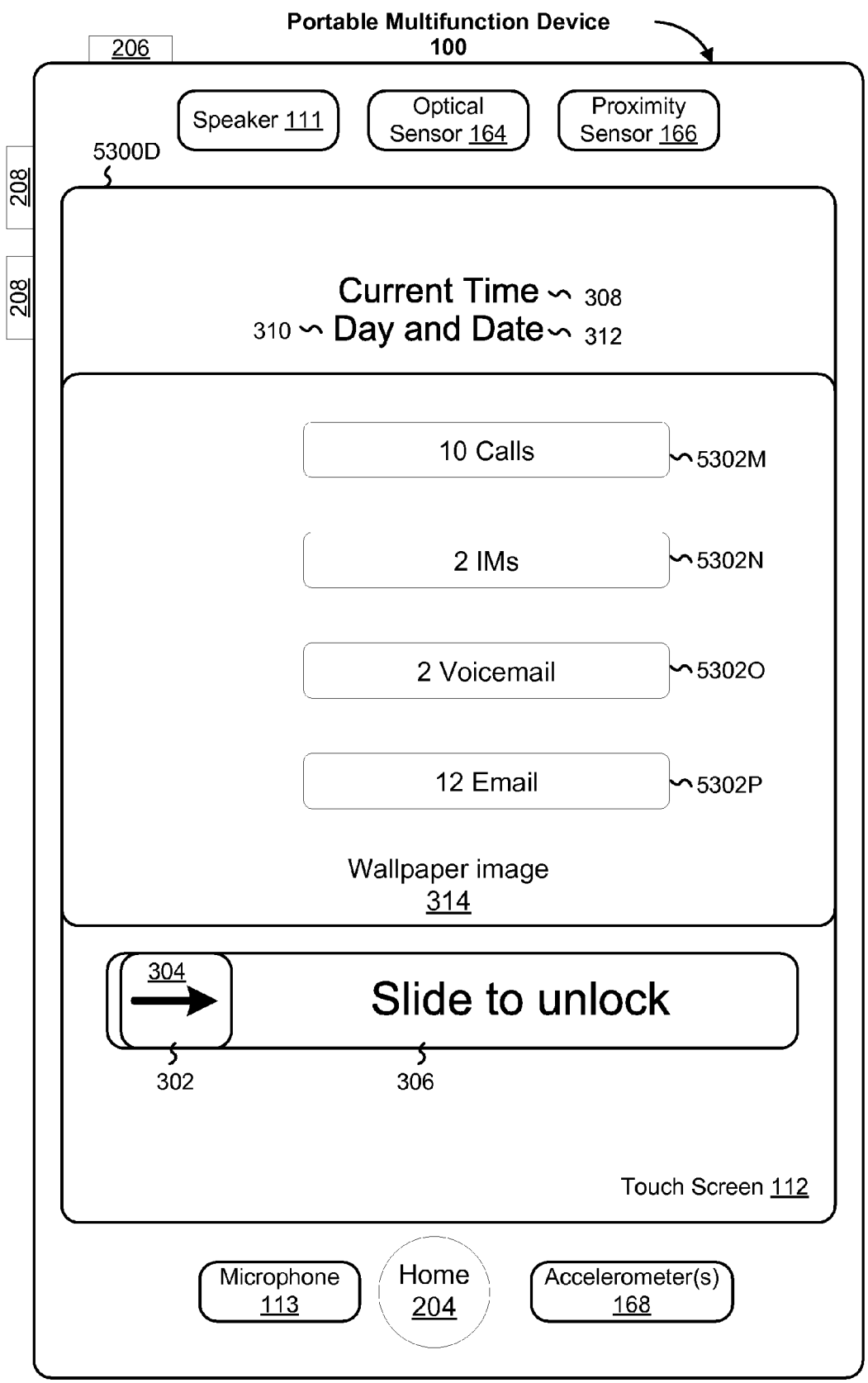
Figure 5E:
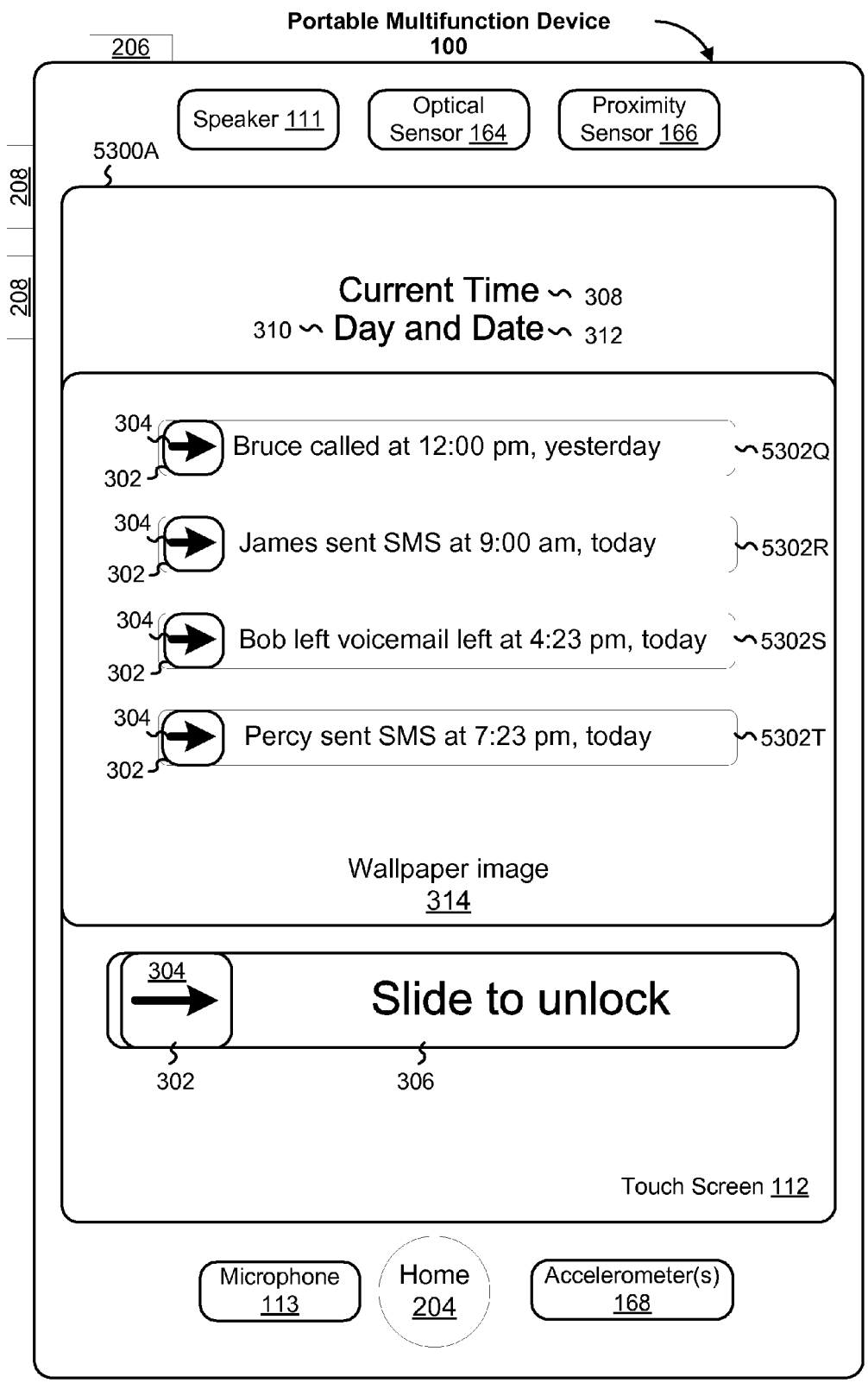
Figure 5F:
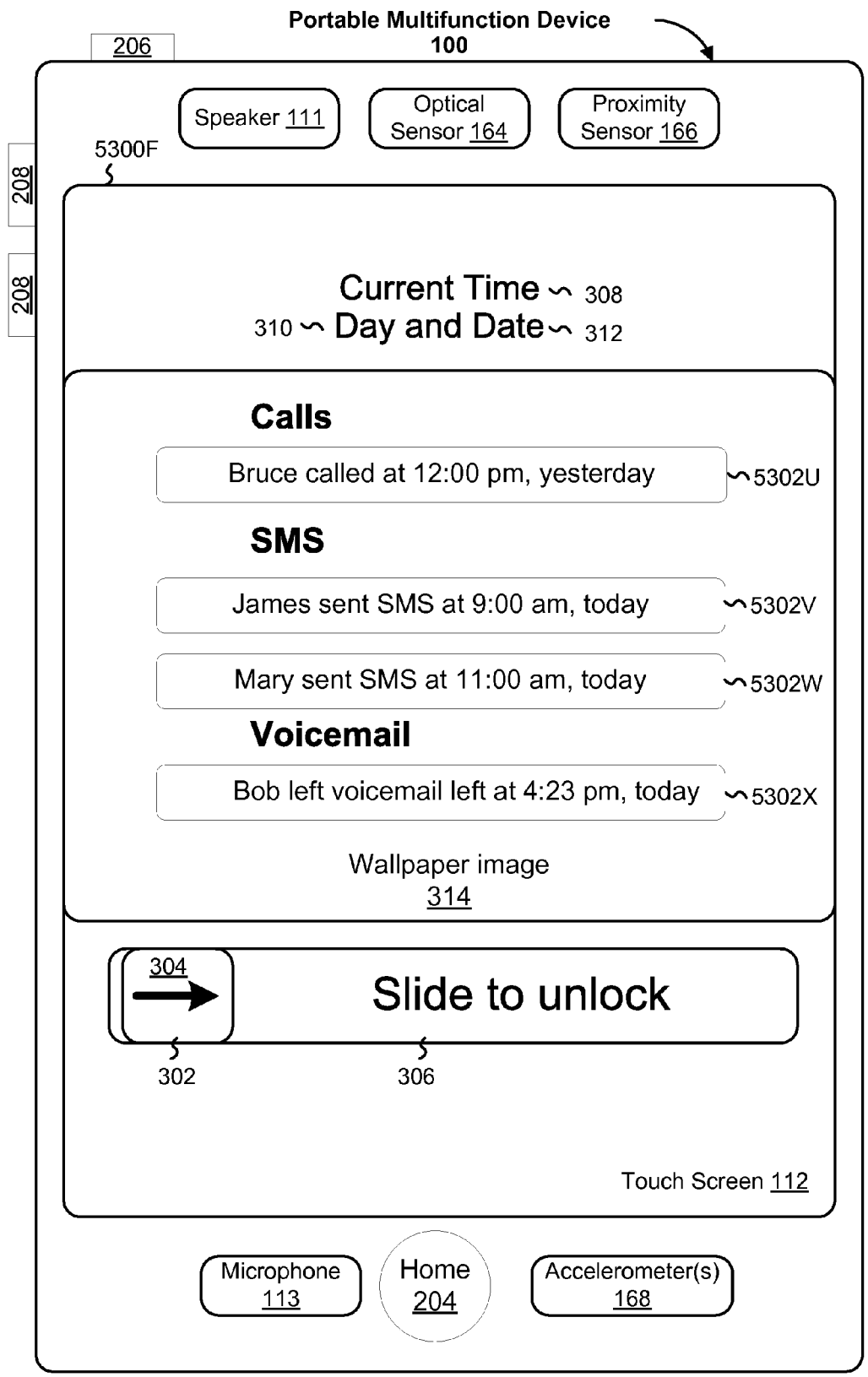

In some embodiments, the notification information is displayed as icons, wherein the icons are organized by communication modality (e.g., FIGS. 5C, 5D, and 5F). In some embodiments, a single icon is displayed for each communication modality, wherein the single icon indicates the number of communications received for the corresponding communication modality while the device was in the locked state (e.g., FIG. 5D).

In some embodiments, for a respective communication modality, a plurality of icons are displayed, each icon corresponding to a single communication in the respective communication modality (e.g., FIG. 5F). In some embodiments, for a respective communication modality: a plurality of icons are displayed, each icon corresponding to a single communication in the respective communication modality (e.g., FIG. 5F for a respective modality), up to a predetermined number of communications; and a single icon is displayed for the respective communication modality above the predetermined number (e.g., FIG. 5D for the respective modality).

In some embodiments, the notification information is displayed as icons, wherein the icons are organized by communication source (e.g., FIG. 5B, where the sources are Percy and Henry).

An unlock interaction by the user is detected (808, FIG. 8A; 828 FIG. 8B) on the device. An exemplary unlock interaction is described above in the description for FIG. 3. In some embodiments, detecting the unlock interaction includes detecting a finger gesture on or near the touch screen display (828, FIG. 8B).

In response to detecting the unlock interaction, the device is unlocked (810 FIG. 8A; 830 FIG. 8B)

In response to detecting the unlock interaction, a communication in the plurality of communications that was received while the device was in the locked state is presented or information about the communication is presented (812, FIG. 8A; 832 FIG. 8B). The presented communication or information is presented in accordance with the corresponding communication modality. For example, for a missed call, information about the missed call is presented in a missed call UI (e.g., UI 2800B, FIG. 6B) or a recent calls UI (e.g., UI 2800A, FIG. 6A) in the phone application 138. As another example, for a voicemail, the voicemail is presented (e.g., played) in a voicemail UI (e.g., UI 3200A, FIG. 7A) in the phone application 138. Alternatively, for a voicemail, information about the voice mail (e.g., the name 3210 of the person who left the voicemail and the date/time 3212 of the voicemail, FIG. 7A) is presented (e.g., displayed) in the voicemail UI (e.g., UI 3200A, FIG. 7A). As another example, for an instant message, the instant message is displayed in the instant messaging application 141. As another example, for an email, the email is presented in the email application 140. Alternatively, for an email, information about the email is displayed in an inbox in the email application 140.

In some embodiments, the communication in the plurality of communications (or information about the communication) that is presented corresponds to the most recent communication received by the device. In some embodiments, the communication in the plurality of communications (or information about the communication) that is presented corresponds to a communication selected by the user (e.g., by a gesture on an icon corresponding to the communication prior to the unlock interaction).

In some embodiments, the notification information is displayed as icons and the unlock interaction is performed on one of the icons (e.g., FIG. 5E). In some embodiments, the presented communication or information is presented in an application associated with the icon on which the unlock interaction is performed. For example, in FIG. 5E, each notification icon 5302 includes an unlock image. Performing the unlock interaction on the unlock image 302 in notification icon 5302S will unlock the device and present the voicemail left by Bob in the phone voicemail application. Similarly, in FIG. 5E, performing the unlock interaction on the unlock image 302 in notification icon 5302T will unlock the device and present the SMS left by Percy in the IM application.

In some embodiments, the communication notification icon 5302 does not include an unlock image 302. In such embodiments, the user may still perform an unlock gesture on the communication notification icon 5302. The presented communication or information may be presented in an application associated with the icon on which the unlock interaction is performed.

Figure 6A:
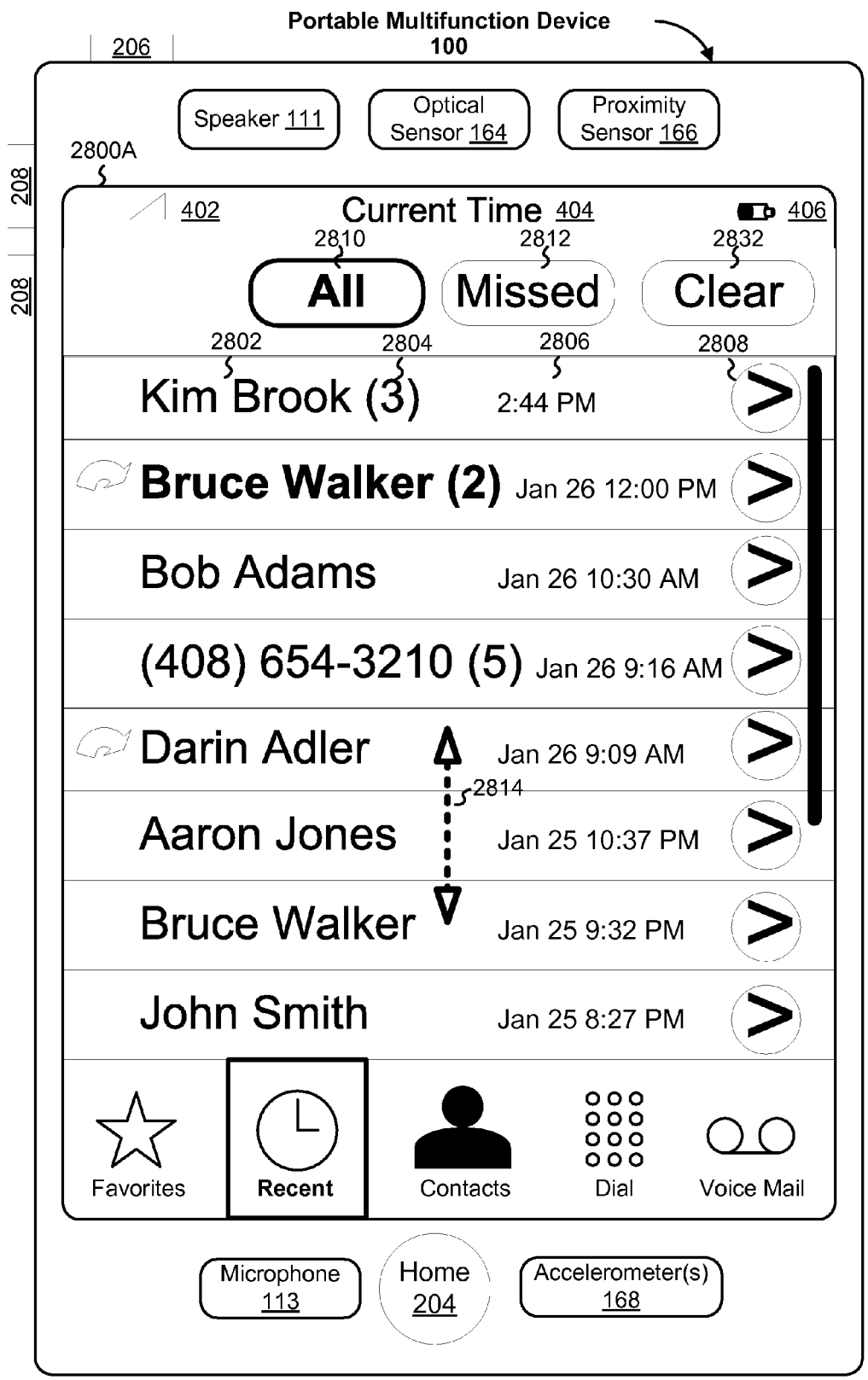
FIGS. 6A-6D illustrate an exemplary user interface for displaying and managing recent calls in accordance with some embodiments.
Figure 6B:
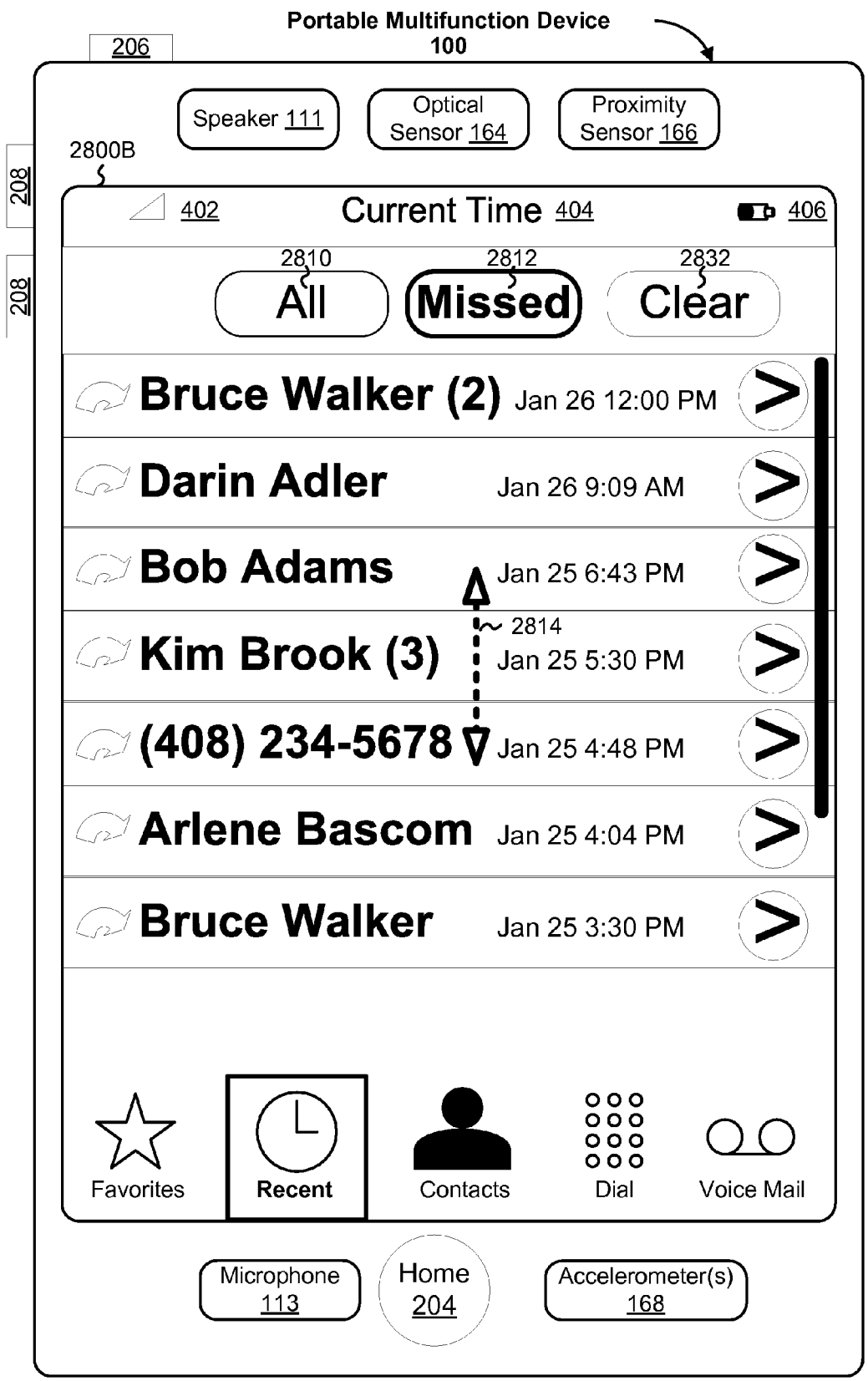
Figure 6C:
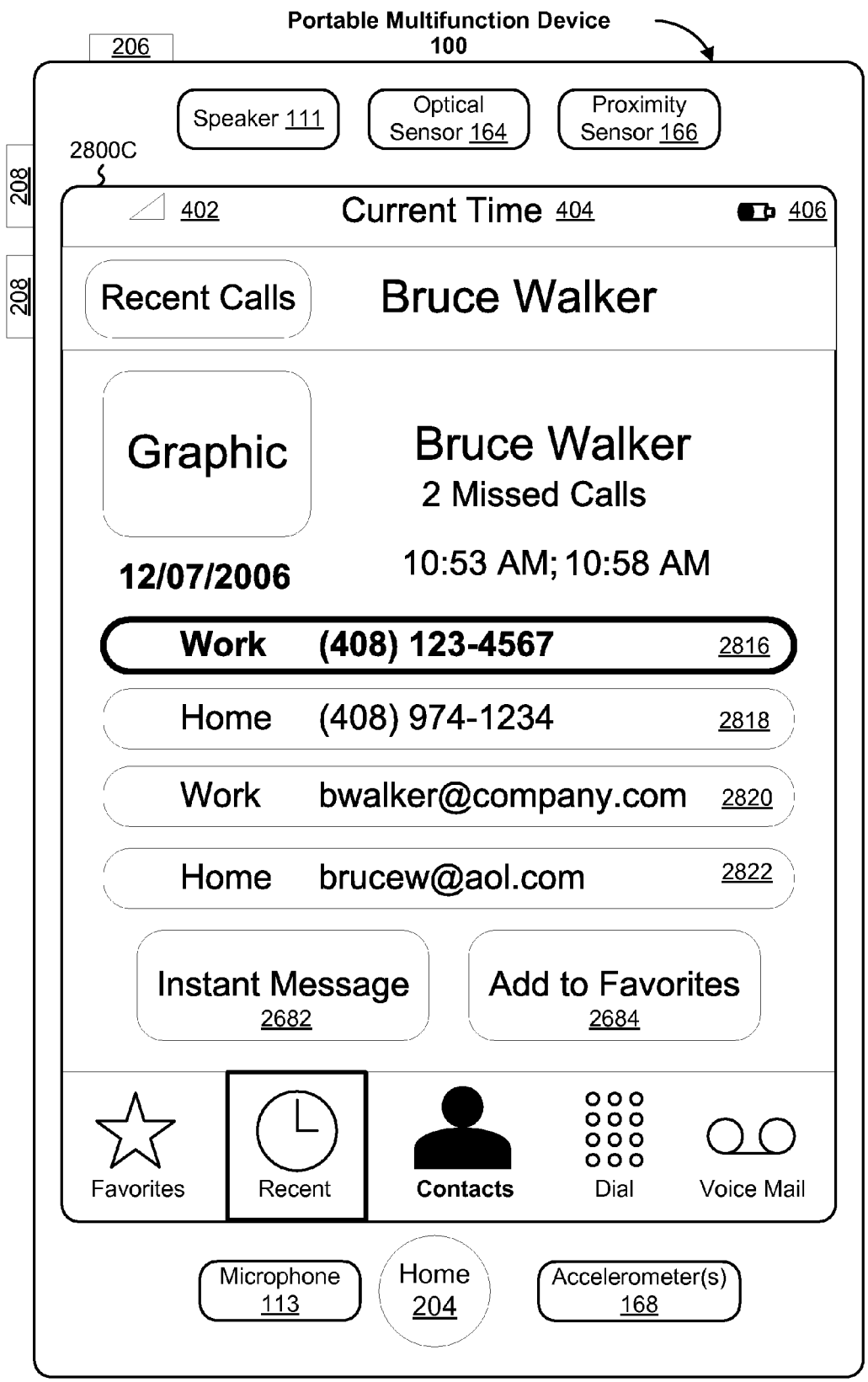
Figure 6D:
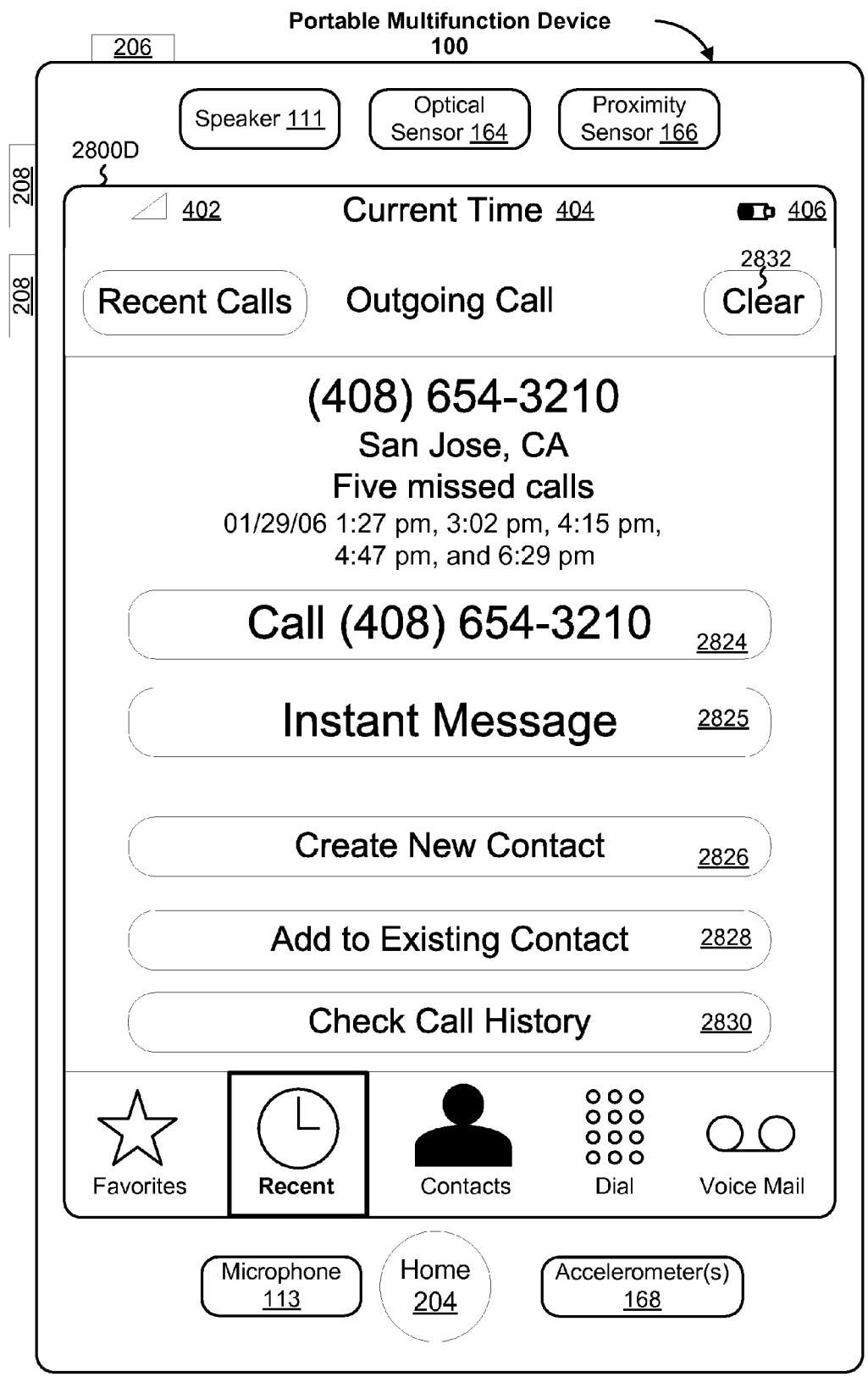

For example, if a user performs an unlock gesture on communication notification icon 5302U (FIG. 5F), then a recent calls UI 2800A, as shown in FIG. 6A, may be displayed, showing the recent call log in the phone application. The recent calls UI 2800A presents information about the missed phone call communication (e.g., "Bruce Walker (2) Jan 26 12:00 PM" in FIG. 6A). Alternately, if a user performs an unlocking gesture on communication notification icon 5302U (FIG. 5F), then a missed calls UI 2800B, as shown in FIG. 6B, may be displayed, showing the user's missed calls in the phone application. The missed calls UI 2800B presents information about the missed phone call communication (e.g., "Bruce Walker (2) Jan 26 12:00 PM" in FIG. 6B).

Figure 7A:
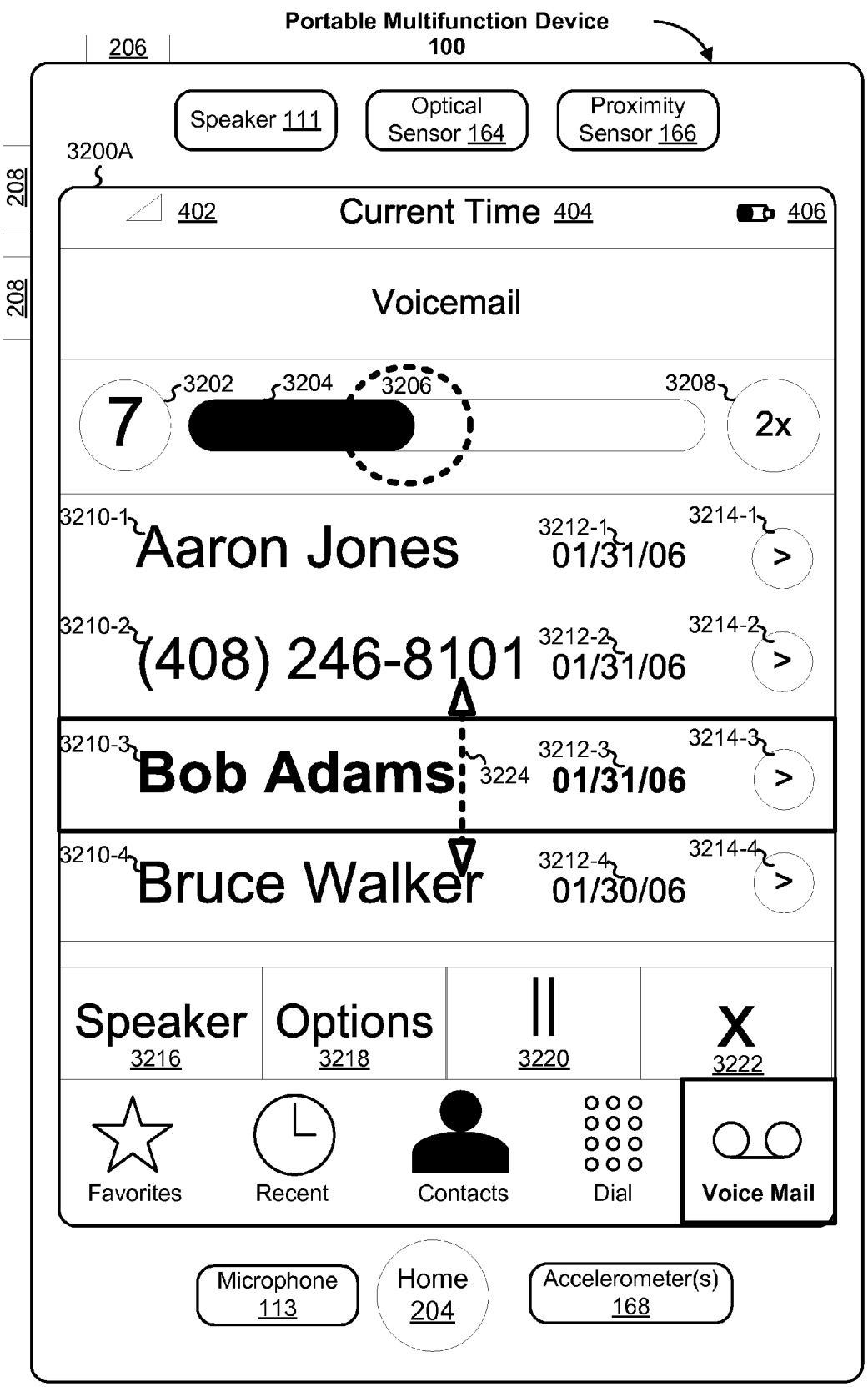
FIGS. 7A and 7B illustrate an exemplary user interface for voicemail in accordance with some embodiments.

As another example, if a user performs an unlocking gesture on the communication notification icon 5302S (FIG. 5E) or on communication notification icon 5302X (FIG. 5F), then voicemail UI 3200A in the phone application, as illustrated in FIG. 7A, may be displayed. The voicemail UI 3200A presents information about the voicemail communication (e.g., the name 3210 of the person who left the voicemail and the date/time 3212 of the voicemail, FIG. 7A). If the communication notification icon corresponds to a single communication (e.g., a single voicemail), then the communication may be presented in the application associated with the icon on which the unlock interaction is performed (e.g., Bob's voicemail, which corresponds to icon 5302S, may start playing in the voicemail UI in the phone application when the device is unlocked). If the communication notification icon corresponds to more than one communication (e.g., two or more voicemails), then information about the communications may be presented in the application associated with the icon on which the unlock interaction is performed (e.g., a voicemail UI that presents information about the two or more voicemails may be shown when the device is unlocked).

The above figures illustrate exemplary communication notifications in accordance with some embodiments. In some embodiments, other types of notifications may also be presented, such as calendar event reminders showing missed appointments, alarm clock alerts, stock price notifications, or other types of user-specified event notifications.

The discussion below of FIGS. 6A-6D, 7A, and 7B provides additional details of user interfaces in the phone application that may appear when the device is unlocked. Additional details of other user interfaces that may appear when the device is unlocked (e.g., user interfaces for instant messaging) are described in U.S. Provisional Patent Application No. 60/879,469, filed Jan. 8, 2007, entitled "Portable Multifunction Device," which is incorporated by referenced herein in its entirety.

FIGS. 6A-6D illustrate an exemplary user interface for displaying and managing recent calls in accordance with some embodiments.

In some embodiments, in response to the user activating All icon 2810, the touch screen displays a list of all recent calls (e.g., UI 2800A, FIG. 6A). In some embodiments, in response to the user activating Missed icon 2812, the touch screen displays a list of recent missed calls (e.g., UI 2800B, FIG. 6B).

In some embodiments, each row in a list corresponds to a call or a consecutive sequence of calls involving the same person or the same number (without an intervening call involving another person or another phone number). In some embodiments, each row includes: the name 2802 of the other party (if available via the contact module) or the phone number (if the name of the other party is not available); the number 2804 of consecutive calls (in an exemplary embodiment, number 2804 is not displayed if the number of consecutive calls is equal to one); the date and/or time 2806 of the last call; and an additional information icon 2808. In some embodiments, in response to the user activating icon 2808 for a particular row (e.g., by a finger tap on the icon), the touch screen displays the corresponding contact list entry for the other party (e.g., UI 2800C, FIG. 6C) or UI 2800D (FIG. 6D) if the phone number cannot be associated with an entry in the user's contact list. In some embodiments, in response to a user tap or other predefined gesture elsewhere (i.e., a tap or gesture other than on icon 2808) in a given row, the phone module dials the corresponding phone number for that row.

In some embodiments, some rows may include icons indicating whether the last call associated with the row was missed or answered.

If the list of recent calls fills more than the screen area, the user may scroll through the list using vertically upward and/or vertically downward gestures 2814 on the touch screen.

In some embodiments, UI 2800C highlights (e.g., with color, shading, and/or bolding) the phone number associated with the recent call (e.g., the two recent incoming calls from Bruce Walker in UI 2800A came from Bruce Walker's work number 2816). In some embodiments, in response to a user tap or other predefined gesture on the highlighted number 2816, the phone module dials the highlighted number (e.g., 2816). In some embodiments, in response to a user tap or other predefined gesture on another number in the contact list entry (e.g., home number 2818), the phone module dials the corresponding number. In some embodiments, in response to a user tap or other predefined gesture on an email address in the contact list entry (e.g., either work email 2820 or home email 2822), the mail module prepares an email message with the selected email address, ready for text input by the user. Thus, by selecting icon 2808, the user may then easily respond to a caller using the same number involved in the previous call (e.g., 2816), another number associated with the same caller (e.g., 2818), or another mode of communication besides the phone (e.g., an email to the caller's work 2820 or home 2822 email address).

In some embodiments, UI 2800D provides one or more options for a user to make use of a phone number in a recent call that is not associated with an entry in the user's contact list. In some embodiments, in response to a tap or other predefined user gesture, the device may: call the phone number (e.g., if the gesture is applied to icon 2824); create a new contact with the phone number (e.g., if the gesture is applied to icon 2826); add the phone number to an existing contact (e.g., if the gesture is applied to icon 2828); or check the call history associated with the number (e.g., if the gesture is applied to icon 2830).

Figure 7B:
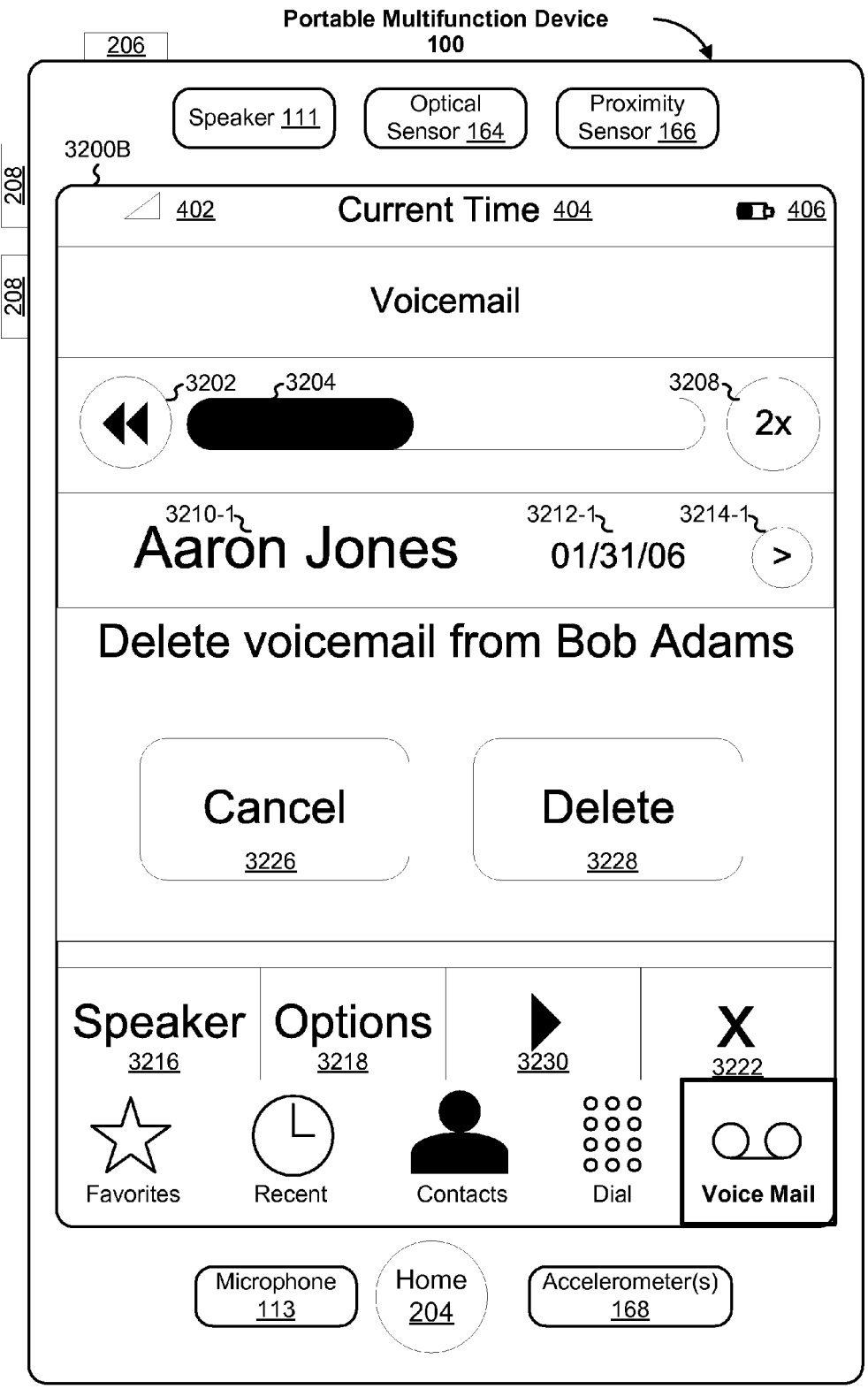

FIGS. 7A and 7B illustrate an exemplary user interface for voicemail in accordance with some embodiments. In some embodiments, user interfaces 3200A and 3200B include the following elements, or a subset or superset thereof:

- 402, 404, and 406, as described above;
- backup icon 3202 that when activated (e.g., by a finger tap on the icon) initiates a process that backs up and replays the preceding few seconds of the voicemail message;
- Progress bar 3204 that indicates what fraction of a voicemail message has been played and that may be used to help scroll through the message in response to a user gesture 3206;
- Speed up icon 3208 that when activated (e.g., by a finger tap on the icon) initiates a process that speeds up playback of the voicemail message, which may also adjust the sound frequency or pitch of the fast playback so that the words, although spoken quickly, are still easy to understand:
- Names 3210 of the people (associated with incoming phone numbers via the user's contact list) who have left voicemail messages (e.g., Aaron Jones 3210-1) or the phone number if the person's name is not available (e.g., 408-246-8101 3210-2);
- Date 3212 and/or time of the voicemail;
- Additional information icon 3214 that when activated (e.g., by a finger tap on the icon) initiates transition to the corresponding contact list entry (e.g., UI 2800C, FIG. 6C) or to a UI for unknown phone numbers (e.g., UI 2800D, FIG. 6D);
- Speaker icon 3216 that when activated (e.g., by a finger tap on the icon) initiates playback of the voicemail through a speaker;
- Options icon 3218 that when activated (e.g., by a finger tap on the icon) initiates display of a menu of additional voicemail options;
- Pause icon 3220 that when activated (e.g., by a finger tap on the icon) initiates pausing of the voicemail;
- Delete symbol icon 3222 that when activated (e.g., by a finger tap on the icon) initiates display of a UI to confirm that the user wants to delete the corresponding voicemail (e.g. UI 3200B, FIG. 7B).
- Cancel icon 3226 that when activated (e.g., by a finger tap on the icon) changes the display from UI 3200B to UI 3200A without deleting the corresponding voicemail;
- Delete icon 3228 that when activated (e.g., by a finger tap on the icon) deletes the corresponding voicemail and changes the display from UI 3200B to UI 3200A; and
- Play icon 3230 that when activated (e.g., by a finger tap on the icon) initiates or continues playback of the voicemail.

If the list of voicemail messages fills more than the screen area, the user may scroll through the list using vertically upward and/or vertically downward gestures 3224 on the touch screen.

In some embodiments, in response to a user tap or other predefined gesture in the row corresponding to a particular voicemail message (but other than a tap or gesture on icon 3214), the phone module initiates playback of the corresponding voicemail message. Thus, there is random access to the voicemail messages and the voicemail messages may be heard in any order.

In some embodiments, in response to a user gesture, the playback position in the voicemail message can be modified. For example, in response to the user's finger touching 3206 at or near a currently playback position in the progress bar and then sliding along the progress bar, the playback position may be altered to correspond to the position of the user's finger along the progress bar. This user gesture on the progress bar makes it easy for a user to skip to and/or replay portions of interest in the voicemail message.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:

at a portable multifunction device with a display:

while the device is in a locked state:

receiving a plurality of communications via a plurality of different communication modalities;

displaying notification information on the display corresponding to a respective communication in the plurality of communications, wherein the notification information corresponding to the respective communication is displayed as a notification icon, detecting a predefined unlock gesture at a location that corresponds to the notification icon, wherein the predefined unlock gesture does not move the notification icon; and in response to detecting the predefined unlock gesture at the location that corresponds to the notification icon:

unlocking the device, and presenting the respective communication, or presenting information about the respective communication, wherein the presented communication or information is presented in accordance with the corresponding communication modality for the respective communication.

2. The method of claim 1, wherein the plurality of communications include text communications and audio/video communications.

3. The method of claim 2, wherein the text communications include instant messages and/or email messages.

4. The method of claim 2, wherein the audio/video communications include phone audio messages and/or video messages.

5. The method of claim 1, wherein the plurality of communications include a phone message, an instant message, and/or an email message.

6. The method of claim 1, wherein the plurality of communication modalities include audio telephony, video telephony, instant messaging, and/or email.

7. The method of claim 1, wherein the display is a touch screen display and detecting the predefined unlock gesture includes detecting a contact by the user with the touch screen display.

8. The method of claim 7, wherein the contact is a finger contact.

9. The method of claim 7, wherein the contact is a stylus contact.

10. The method of claim 1, further comprising, while the device is in the locked state, displaying an unlock image distinct from the notification icon, wherein the unlock image is configured to:
   move in response to interactions by the user with the unlock image; and
   unlock the device in accordance with a determination that the predefined unlock gesture has been performed at a location that corresponds to the unlock image.

11. The method of claim 1, wherein:
   when the notification icon corresponds only to the respective communication, the respective communication is presented in response to detecting the predefined unlock gesture at the location that corresponds to the notification icon; and
   presenting the respective communication includes automatically, without user intervention, providing content of the communication to the user in the application associated with the notification icon.

12. The method of claim 1, wherein:
   when the notification icon corresponds to a plurality of communications received via a respective communication modality including the respective communication, information about the respective communication is presented in response to detecting the predefined unlock gesture at the location that corresponds to the notification icon; and
   presenting information about the respective communication includes displaying information about two or more of the plurality of communications received via the respective communication modality in the application associated with the notification icon.

13. A graphical user interface displayed on a portable electronic device with a display, comprising:
   a plurality of icons displaying notification information; wherein:
   while the device is in a locked state:
   a plurality of communications are received via a plurality of different communication modalities;
   notification information is displayed on the display corresponding to a respective communication in the plurality of communications, wherein the notification information corresponding to the respective communication is displayed as a notification icon;
   a predefined unlock gesture is detected at a location that corresponds to the notification icon, wherein the predefined unlock gesture does not move the notification icon; and
   in response to detecting the predefined unlock gesture at the location that corresponds to the notification icon:
   the device is unlocked, and
   the respective communication is presented, or information about the respective communication is presented, wherein the presented communication or information is presented in accordance with the corresponding communication modality for the respective communication.

14. A portable multifunction device, comprising:
   a display;
   one or more processors;
   memory; and
   one or more programs, wherein the one or more programs are stored in the memory and configured to be executed by the one or more processors, the programs including instructions for:
   while the device is in a locked state:
   receiving a plurality of communications via a plurality of different communication modalities;
   displaying notification information on the display corresponding to a respective communication in the plurality of communications, wherein the notification information corresponding to the respective communication is displayed as a notification icon;
   detecting a predefined unlock gesture at a location that corresponds to the notification icon, wherein the predefined unlock gesture does not move the notification icon; and
   in response to detecting the predefined unlock gesture at the location that corresponds to the notification icon:
   unlocking the device, and
   presenting the communication, or presenting information about the respective communication, wherein the presented communication or information is presented in accordance with the corresponding communication modality for the respective communication.

15. The device of claim 14, wherein the display is a touch screen display and detecting the predefined unlock gesture includes detecting a contact by the user with the touch screen display.

16. The device of claim 14, comprising instructions for, while the device is in the locked state, displaying an unlock image distinct from the notification icon, wherein the unlock image is configured to:
   move in response to interactions by the user with the unlock image; and
   unlock the device in accordance with a determination that the predefined unlock gesture has been performed at a location that corresponds to the unlock image.

17. The device of claim 14, wherein:
   when the notification icon corresponds only to the respective communication, the respective communication is presented in response to detecting the predefined unlock gesture at the location that corresponds to the notification icon; and
   presenting the respective communication includes automatically, without user intervention, providing content of the communication to the user in the application associated with the notification icon.

18. The device of claim 14, wherein:
when the notification icon corresponds to a plurality of communications received via a respective communication modality including the respective communication, information about the respective communication is presented in response to detecting the predefined unlock gesture at the location that corresponds to the notification icon; and
presenting information about the respective communication includes displaying information about two or more of the plurality of communications received via the respective communication modality in the application associated with the notification icon.

19. A non-transitory computer readable storage medium storing one or more programs, the one or more programs comprising instructions, which when executed by a portable multifunction device with a display, cause the device to:
while the device is in a locked state:
receive a plurality of communications via a plurality of different communication modalities;
display notification information on the display corresponding to a respective communication in the plurality of communications, wherein the notification information corresponding to the respective communication is displayed as a notification icon;
detect a predefined unlock gesture at a location that corresponds to the notification icon, wherein the predefined unlock gesture does not move the notification icon; and
in response to detecting the predefined unlock gesture at the location that corresponds to the notification icon:
unlock the device, and
present the respective communication, or present information about the respective communication, wherein the presented communication or information is presented in accordance with the corresponding communication modality for the respective communication.

20. The computer readable storage medium of claim 19, wherein the display is a touch screen display and detecting the predefined unlock gesture includes detecting a contact by the user with the touch screen display.

21. The computer readable storage medium of claim 19, comprising instructions which cause the device to, while the device is in the locked state, display an unlock image distinct from the notification icon, wherein the unlock image is configured to:
move in response to interactions by the user with the unlock image; and
unlock the device in accordance with a determination that the predefined unlock gesture has been performed at a location that corresponds to the unlock image.

22. The computer readable storage medium of claim 19, wherein:
when the notification icon corresponds only to the respective communication, the respective communication is presented in response to detecting the predefined unlock gesture at the location that corresponds to the notification icon; and
presenting the respective communication includes automatically, without user
intervention, providing content of the communication to the user in the application associated with the notification icon.

23. The computer readable storage medium of claim 19, wherein:
when the notification icon corresponds a plurality of communications received via a respective communication modality including the respective communication, information about the respective communication is presented in response to detecting the predefined unlock gesture at the location that corresponds to the notification icon; and
presenting information about the respective communication includes displaying information about two or more of the plurality of communications received via the respective communication modality in the application associated with the notification icon.

* * * * *